United States Patent [19]

Hamaoka et al.

[11] Patent Number: 4,901,169

[45] Date of Patent: Feb. 13, 1990

[54] DATA RECORDING APPARATUS ABLE TO ACCURATELY ACCESS A FLOPPY DISK REGARDLESS OF RECORDING DENSITY

[75] Inventors: Hiromi Hamaoka; Shoji Saito, both of Fuji, Japan

[73] Assignee: Kabushiki Kaisha Toshiba, Kawasaki, Japan

[21] Appl. No.: 153,711

[22] Filed: Feb. 8, 1988

[30] Foreign Application Priority Data

Feb. 27, 1987 [JP] Japan .................. 62-44544

[51] Int. Cl.[4] .................. G11B 5/03; G11B 5/09
[52] U.S. Cl. .................. 360/66; 360/48
[58] Field of Search .............. 360/66, 68, 31, 60, 360/48; 369/53, 58

[56] References Cited

U.S. PATENT DOCUMENTS

| | | | |
|---|---|---|---|
| 3,900,894 | 8/1975 | Aziz | 360/66 |
| 4,298,897 | 11/1981 | Arter et al. | 360/48 |
| 4,414,589 | 11/1983 | Oliver et al. | 360/31 |
| 4,455,582 | 6/1984 | Yanagida et al. | 360/66 |
| 4,622,601 | 11/1986 | Isozaki et al. | 360/48 |
| 4,644,418 | 2/1987 | Banno et al. | 360/48 |
| 4,754,344 | 6/1988 | Shoji et al. | 360/48 |

Primary Examiner—Vincent Canney
Attorney, Agent, or Firm—Cushman, Darby & Cushman

[57] ABSTRACT

A floppy disk drive apparatus capable of using high- and low-density disks includes an erase section. When it is determined that a floppy disk to be used has a high-density, data is immediately written on the floppy disk in response to a write command. However, when it is determined that the floppy disk to be used has a low-density, data, which has previously been recorded on the recording area of the track where the read/write head is currently located, is erased prior to the writing of new data. After erasure is completed, the new data is recorded on the recording area, in response to a write signal.

13 Claims, 3 Drawing Sheets

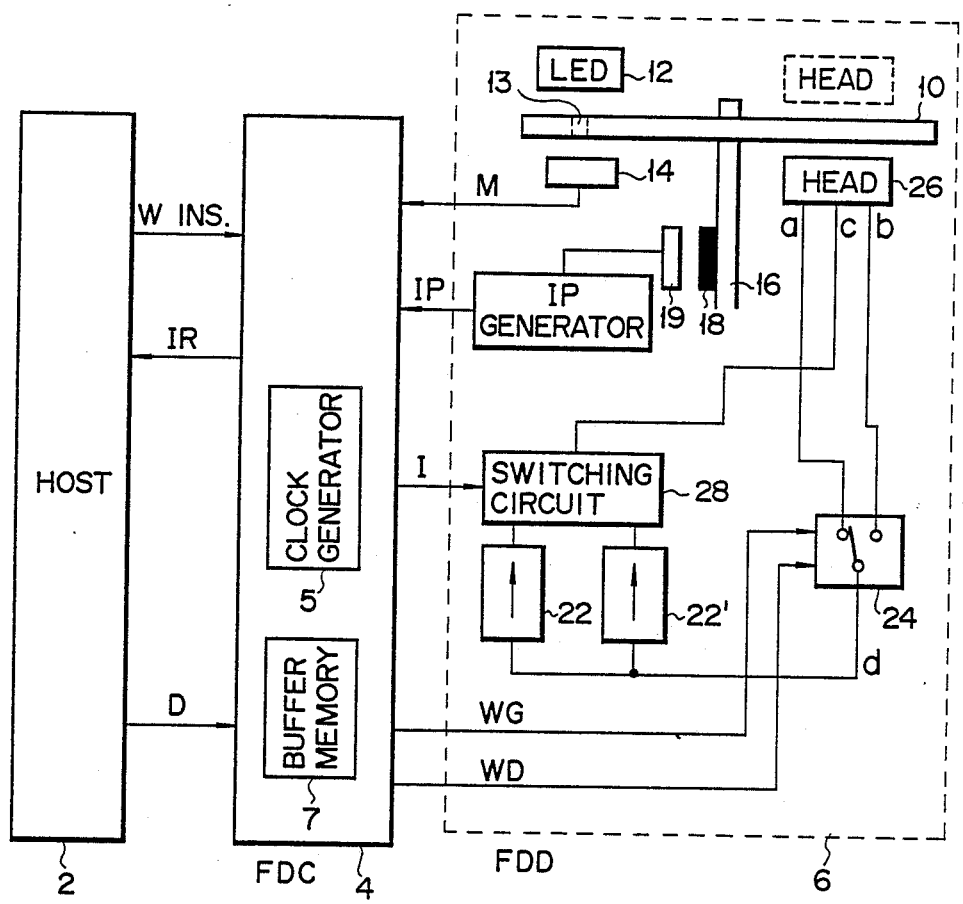
F I G. 3

DATA RECORDING APPARATUS ABLE TO ACCURATELY ACCESS A FLOPPY DISK REGARDLESS OF RECORDING DENSITY

BACKGROUND OF THE INVENTION

The present invention relates to a floppy disk drive apparatus capable of using both high- and low-density disks.

When data is to be recorded on a disk, the recording density depends on the gap length of the read/write head. More specifically, as the gap length is elongated, the disk is deeply magnetized. However, the resolution is decreased, and hence it is not desirable for a read/write operation in a high-density recording disk. On the other hand, as the gap length is shortened, the depth of magnetization becomes shallow, thereby degrading the overwrite characteristic. For this reason, it is not desirable for a read/write operation in a low-density disk. Accordingly, a disk to be used is selected on the basis of the gap length of the read/write head. However, a floppy disk drive apparatus must have compatibility with both high- and low-density disks.

In a conventional floppy disk drive apparatus, a magnetic head using a tunnel erase system is often used. Generally, in this system, data written in a recording area is erased by overwrite. If data is written on a disk, which has been used in a floppy disk drive apparatus including a read/write head having a long gap length, using a drive apparatus for high-density recording, i.e., including a read/write head having a short gap length, the surface of the disk is magnetized by the newly written data. However, residual magnetization is present in a deep portion of the disk. As a result, the overwrite characteristic is degraded, and hence low- and high-density recording cannot be performed by a single apparatus.

SUMMARY OF THE INVENTION

The present invention has been developed in consideration of the above situation, and has as its object to provide a floppy disk drive apparatus which can use both high-density and low-density recording disks. The apparatus includes an erase section. When it is determined that a floppy disk to be used has a high-density, data is immediately written on the floppy disk in response to a write command. However, when it is determined that the floppy disk to be used has a low-density, data recorded in a recording area on a track where a read/write head is currently located is erased before data is written. Then, the data is written in the recording area on the track in response to a write command.

As has been described above, according to the present invention, even if disks having different densities are used, a read/write operation can be reliably performed in each disk without degrading the resolution and overwrite characteristic. Therefore, there is provided a floppy disk drive apparatus having compatibility with both high- and low-density disks.

BRIEF DESCRIPTION OF THE DRAWINGS

FIG. 3 is a block diagram showing the arrangement of a floppy disk drive apparatus according to a second embodiment of the present invention;

DETAILED DESCRIPTION OF THE PREFERRED EMBODIMENTS

A floppy disk drive apparatus according to the present invention will be described in detail below, with reference to the accompanying drawings.

Figures 1, 2:
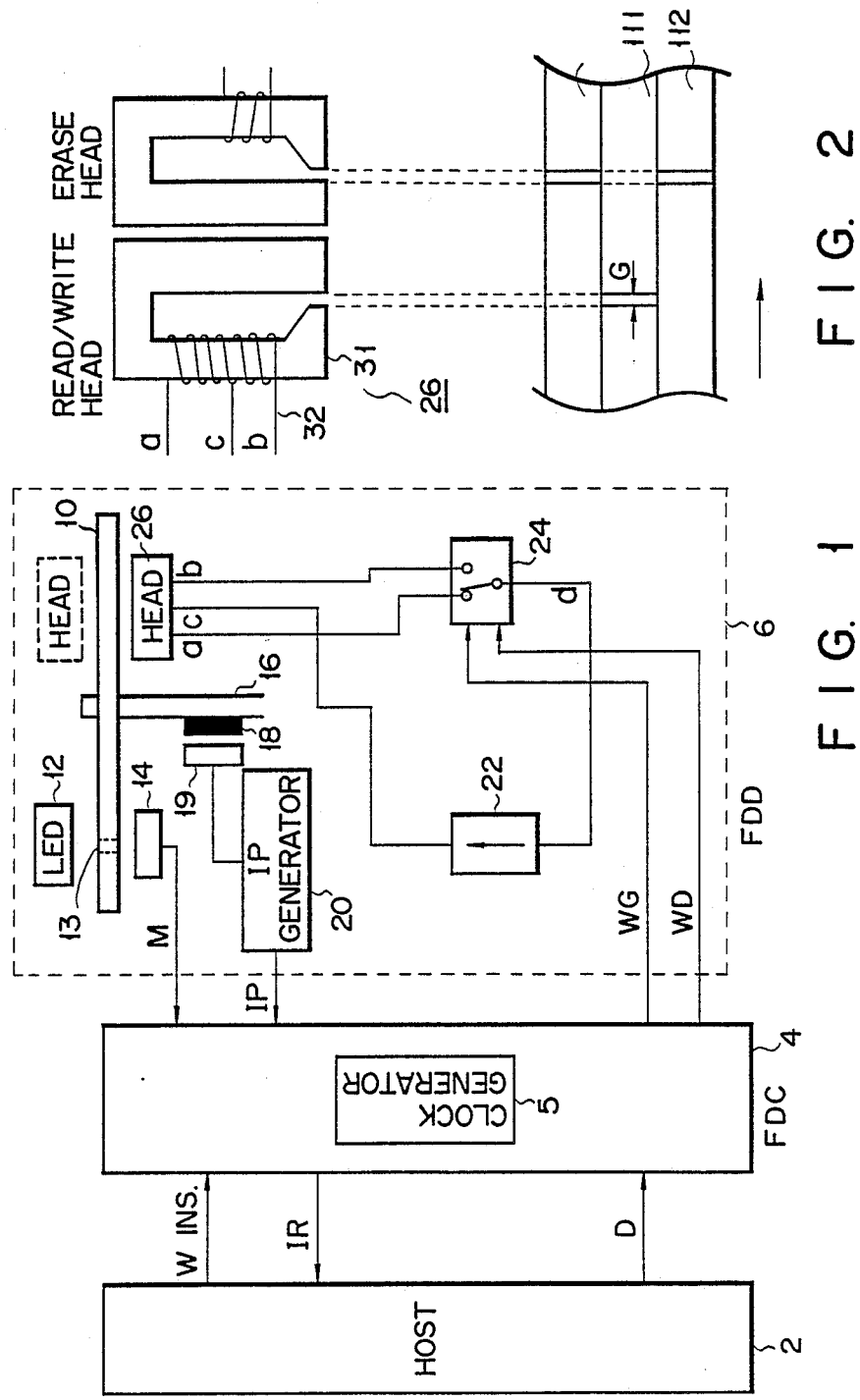
FIG. 1 is a block diagram showing the arrangement of a floppy disk drive apparatus according to a first embodiment of the present invention.
FIG. 2 is a view showing a relationship between a magnetic head in FIG. 1 and a track.
Figure 4:
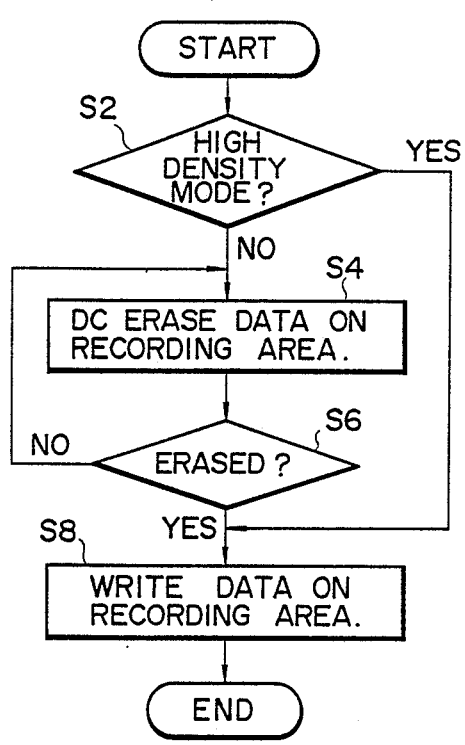
FIG. 4 is a flow chart for explaining the operation of the first embodiment.

The arrangement of a first embodiment will now be described, with reference to FIG. 1. Referring to FIG. 1, floppy disk 10 is inserted into floppy disk drive unit (FDD) 6, and mounted on spindle 16. Floppy disk 10 may have a high- or low-density. At present, a recording capacity criterion for distinguishing between high- and low-density recording disks is 1.6 Mbytes in, for example, 3.5 inch disk. A high-density recording disk is different from a low-density disk in that in the high-density recording disk, square hole (HD hole) 13 is formed in an edge portion, of a case for accommodating the disk, opposite to a write inhibition hole and an HD mark is adhered adjacent to a shutter.

FDD 6 comprises light-emitting element (LED) 12 for detecting whether floppy disk 10 is a high- or low-density recording disk, and light-receiving element 14 for receiving light from LED 12, through hole 13. When light-receiving element 14 detects light from LED 12, it outputs mode signal M indicating that floppy disk 10 has a high density to floppy disk controller (FDC) 4.

When index pulse (IP) generator 20 receives a signal from magnetic sensor 19 for detecting a magnetic field generated by magnet 18 fixed to spindle 16, it generates index pulse signal IP and outputs signal IP to FDC 4.

Constant current source 22 supplies a constant current to intermediate terminal c of read/write head 26 of a head section. As shown in FIG. 2, read/write head 26 includes core 31 having narrow gap G, and coil 32 having intermediate terminal c and terminals a and b. Data is written on recording area 111 by gap G, and the written data is DC-erased. In this case, DC-erase means that disk 10 is magnetized by supplying a current to coil 32 in a given direction, thereby erasing the data on the surface of disk 10. In addition, disk 10 can be magnetized more deeply in the depth direction than in a normal data writing operation. The head section includes an erase head. Read/write head 26 and the erase head constitute the head section of the tunnel erase system. The erase head erases data on areas 112 located on the both sides of recording area 111. A current flowing out from terminal a or b of coil 32 returns to constant current source 22 through switching circuit 24.

Circuit 24 receives write gate signal WG for commanding DC-erase, and write data signal WD corresponding to write data D. Switching circuit 24 keeps line d connected to terminal a or b while signal WG is kept input thereto. If signal WD is input to circuit 24 when signal WG is not input thereto, connection between line d and terminal a or b is switched and connected in accordance with write data D.

When disk 10 is inserted into FDD 6, FDC 4 sets a high- or low-density recording mode according to mode signal M from light-receiving element 14. Furthermore, FDC 4 receives a write instruction (W INS.) from host computer 2, generates interrupt request IR in accordance with a clock from internal clock generator 5, and outputs it to host 2. When FDC 4 receives write data D from host computer 2, it generates write data signal WD and outputs it to switching circuit 24. Host computer 2 outputs write data D to FDC 4 in response to interrupt request IR.

An operation of the first embodiment will be described with reference to FIGS. 4 and 6A to 6D.

Assume that floppy disk 10 is inserted into FDD 6. High-density disk 10 has HD hole 13. Therefore, light emitted from LED 12 is detected by light-receiving element 14, and signal M indicating that disk 10 has a high-density is output to FDC 4. As a result, the high-density recording mode is set. As described above, by utilizing HD hole 13, it can be detected whether a floppy disk is a high-density recording disk. However, a user can input data with respect to a recording density of the floppy disk and set FDC 4 in the high-density recording mode through host computer 2. Furthermore, according to another method, floppy disk 10 is read in the high-density recording mode first. If floppy disk 10 is not correctly read, it is read in the low-density recording mode, thereby checking whether the inserted floppy disk has a high- or low-density.

When FDC 4 receives write instruction W INS. from host computer 2, and it is determined in step S2 that the high-density recording mode is set, step S8 is executed. In step S8, when FDC 4 receives signal IP from IP generator 20, interrupt requests IR are continuously output to host computer 2 in synchronism with the rotation of disk 10 using clocks from clock generator 5. Host computer 2 outputs data D to FDC 4 in accordance with interrupt requests IR therefrom. FDC 4 generates write data WD from data D, and causes head 26 to write the data in a recording area, as shown in FIG. 6C.

When it is detected that inserted floppy disk 10 has a low-density and the low-density recording mode is set, step S4 is executed following step S2. In step S4, data on the recording area is erased in the first cycle in accordance with signal IP from IP generator 20 as shown in FIG. 6A. More specifically, signal IP detected first after magnetic head 26 is set on a target track, is output from generator 20 to FDC 4, as shown in FIG. 6A. FDC 4 outputs signal WG to switching circuit 24, as shown in FIG. 6B. In response to signal WG, switching circuit 24 selects line a or b until next index pulse IP is input thereto. As a result, a constant current flows from constant current source 22 into magnetic head 26 through intermediate terminal c in a given direction, thereby DC-erasing the data on the recording area.

While magnetic head 26 is located on the same track, NO is obtained in step S6 and step S4 is executed until next index pulse signal IP is input. As shown in FIG. 6A, when next index pulse signal IP is input, YES is determined in step S6, i.e., it is determined that DC-erase is completed, and step S8 is executed.

In step S8, write data is written on the recording area in the same manner as in the high-density recording operation described above.

A second embodiment according to the present invention will be described.

An arrangement of the second embodiment will be described with reference to FIG. 3. The same reference numerals in the second embodiment denote the same parts as in the first embodiment, and a description thereof will be omitted. In the second embodiment, FDD 6 includes second constant current source 22' and second switching circuit 28. In response to increment signal I from FDC 4, circuit 28 superposes a constant current from constant current source 22' on a constant current from constant current source 22. FDC 4 further includes buffer memory 7. Buffer memory 7 stores write data D output from host computer 2 in accordance with a write instruction. When data on a recording area is to be DC-erased, FDC 4 outputs signal I to switching circuit 28. In addition, when data write is ready, FDC 4 outputs interrupt request IR to host computer 2. In response to interrupt request IR, host computer 2 outputs write data to buffer memory 7 in FDC 4.

Figure 5:
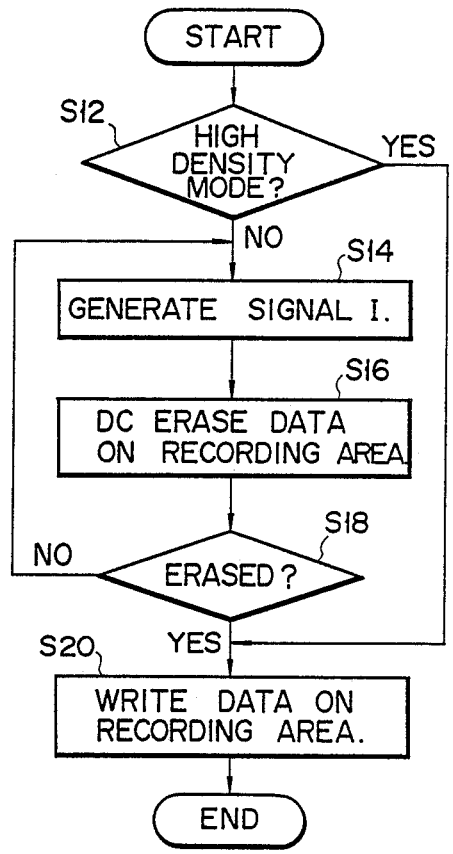
FIG. 5 is a flow chart for explaining the operation of the second embodiment.
Figure 6:
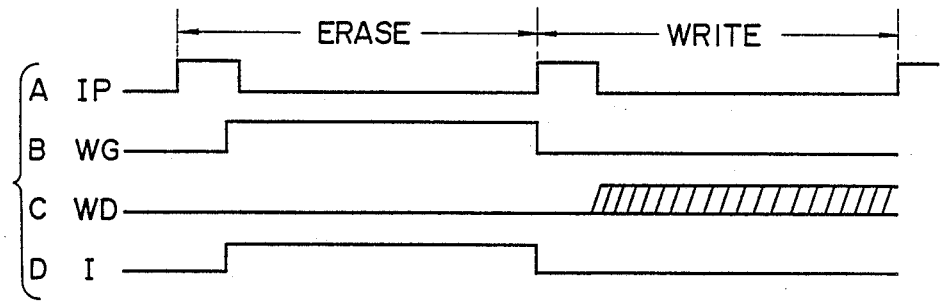
FIGS. 6A to 6D are timing charts for explaining the operation of the first embodiment.

An operation of the second embodiment will now be described with reference to FIGS. 5 and 6. Since the basic operation is the same as that shown in FIG. 4, only the different points will be described. When the low-density recording mode is determined in step S12, FDC 4 outputs signal I to switching circuit 28, as shown in FIG. 6D. As a result, a constant current flows from constant current source 22' into intermediate terminal c of head 26. In step S16, a constant current from constant current source 22 is supplied to intermediate terminal c of head 26 at the same as step S14. As a result, previously recorded data can be erased more deeply than in the first embodiment.

By this time, the write data is transferred from host computer 2 to FDC 4 in accordance with interrupt request IR generated according to a write instruction. When it is confirmed in step S18 that erase is completed in the above-described manner, data is read out from memory 7 in accordance with a clock from clock generator 5. Then, the readout data is supplied to switching circuit 24 as signal WD, thereby writing the data on the recording area, as shown in FIG. 6C. The same operation is performed when the high-density recording mode is determined in step 12.

Although in the above description, a read/write head is arranged on only one side of disk 10, heads can be arranged on both its sides. Also, the present invention is described with respect to 3.5 inch disk. However, the present invention can be applied to, for example, 5 or 8 inch disk.

What is claimed is:

1. A data recording apparatus including at least one read/write head capable of accurately accessing a floppy disk recording medium regardless of a recording density thereof, said floppy disk medium being rotated, comprising:
density determining means for determining whether said medium is of a high or low density;
erase means for selectively erasing data previously recorded on a recording area of a track where said read/right head is currently positioned in accordance with a result determined by said density determining means and a write command input thereto with said erasing being done while a first rotation of said medium is performed;
write means for selectively writing write data on said recording area in accordance with said result determined by said density determining means and said write command input thereto with said writing being done while a second rotation of said medium is performed; and
erase determining means for determining whether erasure of the recorded data by said erase means has been completed said erase determining means comprising generating means for generating index pulses upon rotation of a spindle and determining means for determining, based on the number of pulses received from said generating means, whether erasure of the recorded data on a recording area has been completed.

2. The apparatus according to claim 1, wherein said read/write head comprises a core and a coil having first and second terminals and an intermediate terminal; and said erase means comprises generating means for selectively generating an erase control signal in accordance with the result determined by said density determining means, constant current supply means for supplying a constant current to the intermediate terminal of said coil, and switching means for selectively returning the constant current to said constant current supply means, through the first or second terminal of said coil, in response to the erase control signal from said generating means.

3. The apparatus according to claim 1, wherein said read/write head comprises a core and a coil having first and second terminals and an intermediate terminal; and said erase means comprises generating means for selectively generating erase and increment control signals in accordance with the result determined by said density determining means, first constant current supply means for supplying a first constant current, second constant current supply means for supplying a second constant current, first switching means for selectively supplying at least one of the first and second constant currents, from said first and second constant current supply means, to the intermediate terminal of said coil, in response to the increment control signal from said generating means, and second switching means for selectively returning the first and second constant currents to said first and second constant current supply means, through the first terminal of said coil, in response to the erase control signal from said generating means.

4. The apparatus according to claim 3, wherein said determining means determines that erasure of the recorded data on the recording area is completed when a second index pulse is input with respect to a single track.

5. A method of accurately accessing a floppy disk regardless of a recording density thereof, using at least one read/write head having a short gap length for a high-density floppy disk, comprising:
determining whether the floppy disk has a high- or low-density;
erasing data recorded on a recording area of a track where said read/write head is currently located in response to an input write command when it is determined that the floppy disk is of the low-density;
determining whether erasure of the data is completed when a second index pulse is input with respect to a single track.

6. The apparatus according to claim 1, further comprising detecting means for detecting said first or second rotation of said recording medium.

7. The apparatus according to claim 6, wherein said detecting means comprises:
generating means for generating one index pulse upon one rotation of said medium; and
rotation count detecting means for detecting said first or second rotation in accordance with the number of index pulses received from said generating means.

8. The apparatus according to claim 1, wherein said density determining means includes means for determining from appearance of said medium whether said medium is of the high- or the low-density.

9. A method of accurately accessing a recording disk medium regardless of a recording density thereof, using at least one read/write head including a core and a coil having first and second terminals and an intermediate terminal, said method comprising the steps of:
determining whether said medium is of a high- or low-density;
selectively erasing, in accordance with a result regarding whether said medium is of high- or low-density and a write command, data previously recorded on a recording area of a track on which said read/write head is currently positioned, said erasing being done while a first rotation of said medium is performed, said erasing step including selectively generating an erase control signal in accordance with said result and supplying a constant current from said intermediate terminal of said coil to one of said first and second terminals; and
selectively writing input write data on the recording area in accordance with said result and said write command, while a second rotation of said medium is performed.

10. A method according to claim 9, wherein said read/write head comprises a core and a coil having first and second terminals and an intermediate terminal, and said erasing step comprises:
selectively generating an erase control signal in accordance with said result;
selectively generating erase and increment control signals in accordance with said result;
supplying a first constant current;
supplying a second constant current; and
selectively allowing at least one of said first or second constant currents to flow from the intermediate terminal of said coil to one of said first and second terminals, in response to said increment control signal.

11. The method according to claim 9, further comprising the step of detecting the first or second rotation of said medium.

12. The method according to claim 11, wherein said detecting step comprises:
generating one index pulse upon one rotation of said medium; and
detecting the first and second rotation in accordance with the number of index pulses.

13. The method according to claim 9, wherein said determining step includes determining from appearance of said medium whether said medium is of the high- or the low-density.

* * * * *